Sept. 14, 1954  O. A. ANDLER  2,688,902
TOOL
Filed Oct. 2, 1951  2 Sheets-Sheet 1

WITNESS  INVENTOR.

Sept. 14, 1954     O. A. ANDLER     2,688,902
TOOL
Filed Oct. 2, 1951     2 Sheets-Sheet 2
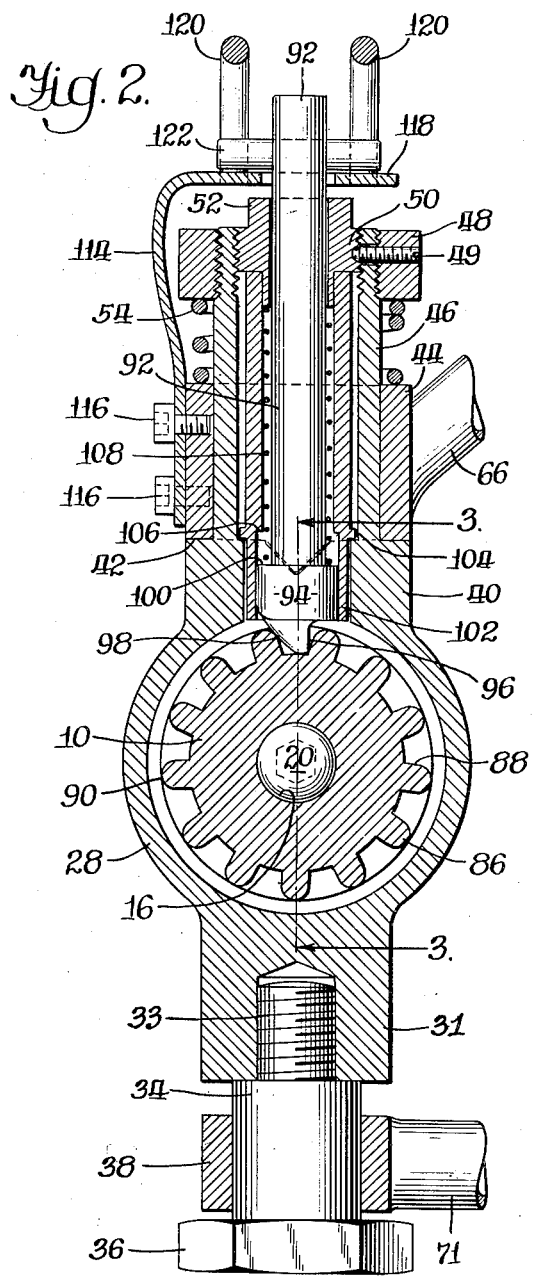
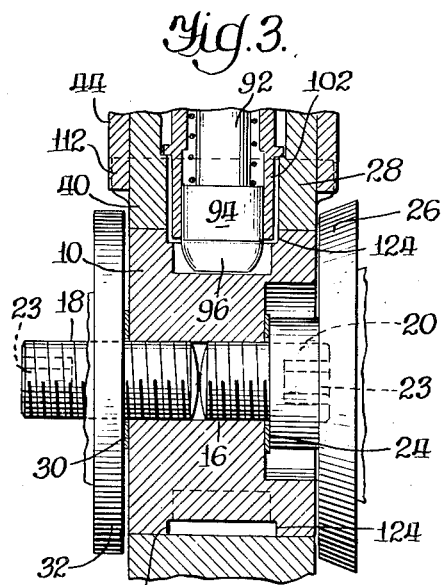
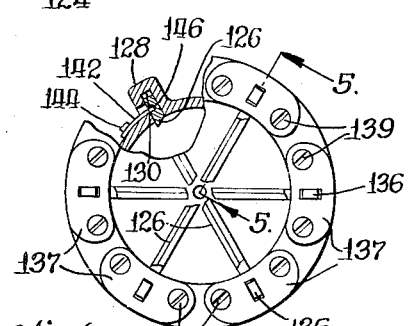
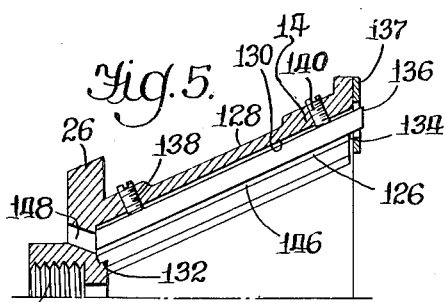
WITNESS.     INVENTOR.
Otto A. Andler Patented Sept. 14, 1954

2,688,902

UNITED STATES PATENT OFFICE 2,688,902

TOOL

Otto A. Andler, Chicago, Ill.

Application October 2, 1951, Serial No. 249,291

7 Claims. (Cl. 90—12)

My invention relates to pipe fitting and includes among its objects and advantages a compact and convenient multiple-operation tool for on-the-spot use in conditioning the ends of pipes at the time of assembly on the job.

Further objects and advantages will become apparent as the description proceeds.

In the accompanying drawings,

Figure 2 is a vertical section through the center of the holder in a plane transverse to the axis of the tool;

Figure 3 is a section on line 3—3 of Figure 2;

Figure 4 is a face view of the female cutting element partly broken away and in section;

Figure 5 is a section on line 5—5 of Figure 4;

Figure 1:
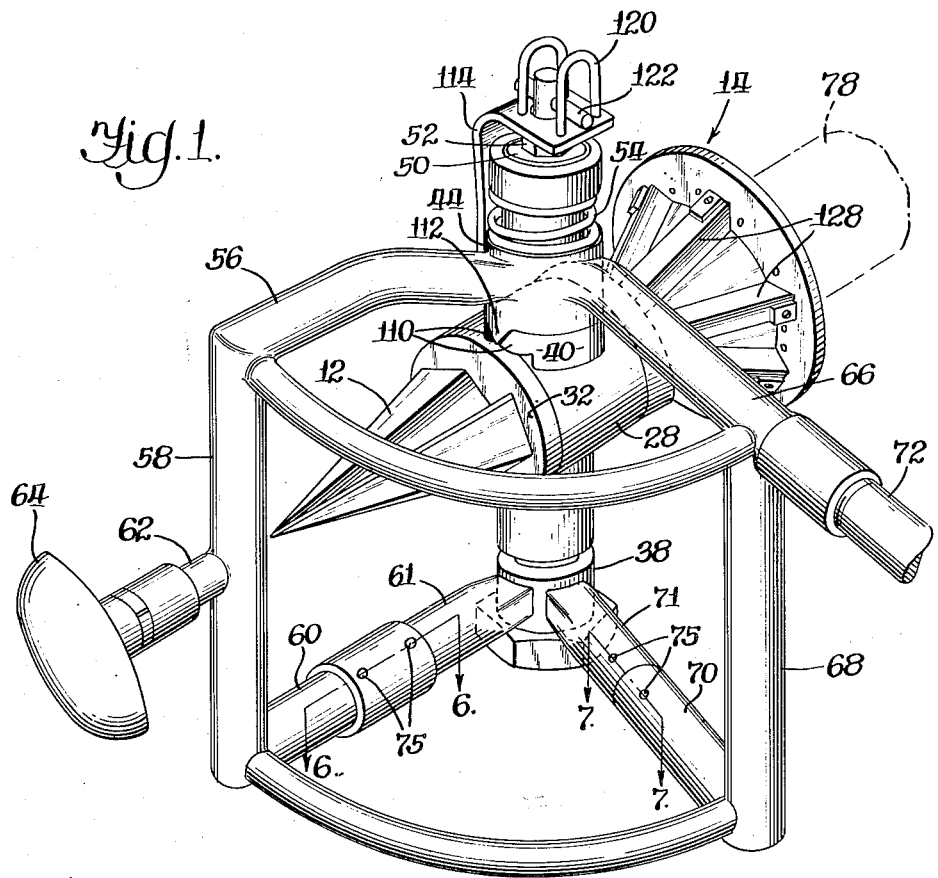
Figure 1 is a perspective view of a complete tool unit according to the invention.

In the embodiment of the invention selected for illustration, the tool proper comprises a hub 10, a male cutting member 12 having three cutting edges, and a female cutting member 14 having six cutting edges. The cutting members are coaxial with the hub and function therewith as a rigid integral unit in use.

Structurally, the hub has a central axial bore at 16 threaded to receive the ends of two male screw-threaded stud members, of which one member 18 is threaded into a tapped hole in the large end of the male cutter 12 and the other 20 is threaded into the threaded hole 22 in the small end of the female cutter. Hexagonal holes at 23 provide for convenience in positioning the stud members 18 and 20. A spacing washer 24 lies between the hub and the end of the female member, which member has a peripheral flange 26 extending radially outward to engage the encircling holder, or carrier 28. On the other end the spacing washer 30 determines the position of the flange 32 which is held in the position illustrated by abutment with the end of the male cutting member 12 and which also extends out far enough to abut the holder 28. This provides metal-to-metal contact over a substantial area through members of substantial strength to receive and transmit axial thrust on the cutting tool. The entire tool is supported by the holder 28 encircling the hub 10.

Means are provided for pivotal support of the holder 28 and the tool carried thereby, pivoted on a transverse axis intersecting the axis of the tool proper. As best indicated in Figures 1 and 2, a boss 34 projects down from the holder and is counterbored and tapped to receive the threaded end 33 of a cylindrical stud 34 having a hexagonal head 36. The stud is screwed home tight, and the cylindrical portion 34 is rotatably received in the lower frame bearing 38. On the upper side a somewhat larger boss 40 coaxial with the boss 31 is made tubular throughout with an external shoulder at 42 for abutment with the upper frame bearing 44, and the tubular extension 46 extending above the bearing 44 to receive an external flange nut 48 and an internal retaining ring 50, both threaded on the extension 46. The ring 50 has a hexagonal nut 52 projecting above the end of the extension 46 for convenience in assembly. The ring 48 provides the upper abutment for a compression spring 54 normally holding the parts in the position illustrated in Figure 2. A set screw 49 has threaded engagement with the outer ring 48, and passes through the extension 46 to enter a shallow socket in the ring 50. This anchors both rings in the positions determined by adjustment at the place of manufacture. It will be noted that the stud 34 extends beyond the lower frame bearing 38 in both directions, leaving sufficient clearance for the holder 28 and parts carried thereby to move downward about a quarter of an inch.

The lower frame bearing 38 and upper frame bearing 44 are part of a rigid frame provided with handle means for exerting axial thrust on the tool and additional handle means for rotating the tool. I have illustrated a tubular construction comprising two C-shaped portions lying in planes substantially at right angles to each other. The thrust portion comprises an upper member 56, a riser 58 and a horizontal strut 60 extending back to the bearing 38. About mid-height of the riser 58 and at the level of the axis of the tool is the horizontal stud 62 carrying the swiveled thrust handle 64. The torque portion includes the upper strut 66 extending out from the bearing 44, the riser 68 and the lower horizontal strut 70. Handle means for rotating the tool is provided in the form of an extension 72 detachably threaded into the end of the strut 66.

Figure 6:
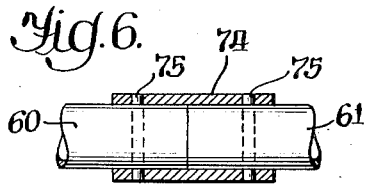
Figure 6 is a section of a frame joint on line 6—6 of Figure 1.
Figure 7:
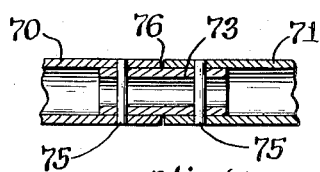
Figure 7 is a section of the other frame joint on line 7—7 of Figure 1.

To facilitate assembly and separation of the holder and frame, the struts 60 and 70 include separable joints. Referring to Figures 6 and 7, I have illustrated the strut 60 in two sections, 60, and 61, with their abutting ends housed in a longitudinally slidable coupling sleeve 74. The outer portion of the strut 70 terminates in abutment with the inner portion 71, and an inside sleeve 73 holds them in alignment. When it is desired to remove the holder from the frame, the sleeve 74 can be displaced in either direction to release that connection, and thereafter the bearing 38 and the strut portions 61 and 71 integral with it can be displaced along the axis of the portion 71 to remove this portion of the frame and allow the holder to be removed from the top bearing 44 by sliding downward. This disconnection of the frame is preceded by removal of the stud 34. I prefer to secure both sleeves 73 and 74 against unintentional longitudinal movement by removable pins 75.

Figure 8:
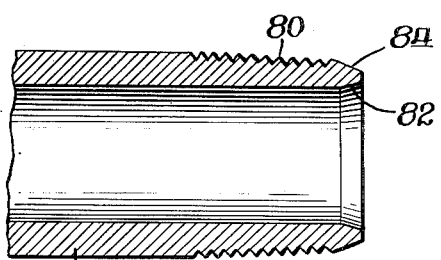
Figure 8 is a detail section of the end of a work piece after it has been machined.

The work to be done by such a tool is the beveling, or chamfering of the edges of a pipe, which usually has pipe threads on it, but the tool is also useful for chamfering the edges of an un-threaded pipe which is subsequently to be assembled by welding. In Figure 8 I have illustrated the end of a pipe 78 having pipe threads at 80. The machine operations for cutting off the end of such a pipe before threading and subsequently making the threads, nearly always leave sharp edges, both inside and outside, at the extreme end, and frequently small burrs. These sharp edges and burrs may be responsible for injuries to workmen, and they also are very prone to get in the way when an assembled unit is being tightened up, and interfere with getting a tight joint. Both objections are substantial, and careful operators customarily remove such burrs before assembling a piece of pipe with other pieces. With a tool according to the invention, the male cutting member 12 may have an appropriate shape to remove the burrs and provide an accurately machined inner chamfer as indicated at 82 in Figure 8, and the female member 14 is available to provide a similar outer surface at 84.

Pawl and ratchet connecting means are provided between the holder 28 and the hub 10 so that a workman can use a handle 72 long enough to get ample leverage and operate by reciprocating the handle through a convenient arc about the axis of the cutting member. I have illustrated ratchet teeth 86 in Figure 2. Each tooth has substantially radial side portions at 88 for about the lower half of its height and a substantially semicircular portion above defining a dome 90. The pawl shaft 92 is vertically slidable inside the extension 46, and its head 94 terminates in an inwardly projecting tooth having a flat face at 96 adapted to engage any of the radial portions 88 for positive action, and an inclined heel 98 on the opposite side, of such inclination that, on movement in the opposite direction, the heel 98 rides up readily on the dome 90, and the pawl clicks over the teeth. For convenience in assembly, and satisfactory guidance and wear, I form the head 94 with an upwardly directed shoulder 100 where it joins the shaft 92, and I guide the head in an intermediate sleeve 102 which may be made of hardened wear-resisting metal. The sleeve 102 has an outwardly extending flange 104 engaging a co-operating shoulder on the boss 40 to limit its inward movement. In assembled position, the sleeve is normally held in abutment with the boss 40 by the retaining ring 50 screwed down against its upper end. Internally, the sleeve has a lower portion of the right size for good slidable engagement with the head 94, a downwardly directed shoulder 106 limiting the upward movement of the head, and a straight cylindrical portion above the shoulder 106 large enough to leave a clearance space outside the shaft 92 to house the light pawl spring 108 which presses downwardly on the head 94 and upwardly on the retaining ring 50.

In Figure 1, the parts are illustrated with the female member 14 in position to engage the work piece 78 to machine the surface at 84. Means are provided for holding the parts in the position of Figure 1 with sufficient force to facilitate this machining operation, and to yield and permit the holder to rotate 180° about a vertical axis to bring the female member 14 back inside the thrust portion of the frame and the male member 12 out into position to engage the work piece. The boss 40 is provided with diametrically opposed tapered notches 110, and the frame bearing 44 has diametrically opposite teeth 112 projecting downwardly into the notches. It will be apparent that after the operator has finished the machining operation indicated in Figure 1, he can set the frame on a bench or on the floor and grasp the member 14 with one hand while holding the frame with the other, and twist the member 14 in either direction from the position of Figure 1. In doing so he must exert enough force to overcome the tension of the spring 54 and displace the holder 28 downwardly about a quarter of an inch so that the teeth 112 ride up out of the notches 110. It is a simple matter to have the spring 54 of the right strength to permit this to be done conveniently, and still retain the parts in position during the cutting operation with ample force. After 180° of rotating, the notches 110 will come in register again with the teeth 112, and the holder will spring back up to its original level, and the tool is ready to be used to insert the cutter 12 inside the work piece and machine the surface 82.

Means are provided for keeping the pawl head 94 facing in the same direction at all times so that the workman does not have to manipulate the tool in a left-handed fashion half the time. As best indicated in Figures 1 and 2, the extension 114 is detachably fastened to the upper frame bearing 44, as by screws 116. It extends up and across above the top of tubular extension 46 to define a platform 118 apertured to clear the upper end of the pawl pin 92. Rigid with the platform are two arches, or wickets 120. The upper end of the shaft 92 is transversely bored to receive a retaining pin 122, which lies above the platform 118 with its ends between the wickets. The engagement of the pin 122 with the wickets 120 limits rotation of the pawl to a few degrees.

When the operator rotates the holder 28 to change from one cutting element to the other, as soon as the pin 122 strikes the wickets, the pawl is no longer able to turn with the teeth 88, and at one side its heel 98 will ride up on the tooth behind it and compress the spring 108 to lift the pawl up above the teeth just as effectively as in the corresponding action during the cutting operation. After the reversal has been completed, the teeth 88 come back into alignment with the face 96 and heel 98, and the pawl drops back into the position of Figure 2, but it is still facing in the same sense, so that the pawl and ratchet action is now reversed with respect to the tool but remains the same with respect to the frame.

For additional convenience and dependability in assembling and disassembling, the sleeve 102, as clearly indicated in Figures 2 and 3, projects downwardly far enough to get in the way of inwardly facing annular shoulders 124 in the adjacent face of the hub 10. This prevents the hub from accidentally falling out of place when a clumsy workman is changing one of the cutting elements, sometimes with the holder in a position where the teeth 112 are pushed out of the notches 110, and the pawl 94 is riding across the teeth 86. But the flanges 26 and 32, as clearly indicated in Figure 3, are positioned to leave a clearance with respect to the holder 28, and this clearance is materially smaller than the clearance between the end of the sleeve 102 and the flanges 124, so that when the tool is in use, and the heavy axial thrust necessary for cutting is being applied, that thrust is transmitted through the flange 26 or the flange 32, which is of ample strength and bearing area for the work.

In Figures 4 and 5 I have illustrated a precision mounting for the teeth 126 of the female cutter. The body of the cutter is a casting of conical shape having six longitudinally extending external ribs 128 registering with internal slots 130. The teeth 26 fit snugly in the slots 130 and, when not under load, are prevented from falling out by a notched interlock with the body at their inner ends at 132. A similar notch 134 at their outer ends leaves a tang 136 which enters a registering aperture in a retaining plate 137 fastened by screws 139. For precision adjustment of the teeth to secure accurate and uniform machining, I provide for each tooth an inner set screw 138 and an outer set screw 140 by means of which the position of the tooth under load can be adjusted accurately.

To keep the cutting blades 126 firmly seated against the set screws when not under load, I provide a simple flat leaf spring 142 for each blade. The spring 142 lies on the outer surface of the casting and is fastened there with a screw 144. Its inner end engages a groove 146 in the side of the blade, and presses the blade against the set screws. The rib 128 is apertured to let the spring reach in to the blade. The tang 136 and plate 137 are arranged to leave a little clearance, so that the exact position of the blade depends on the precision adjustment. The casting is also apertured at 148 (see Figure 5) so that if a blade happens to stick, its end is accessible to drive it out.

Between the blades the body of the casting lies only slightly below the cutting edges, as clearly indicated in Figure 4. Because the body is so shaped, even the smallest pipe, tube or rod for which the tool is adapted, will be guided into proper position and not get caught or fouled between the cutting blades.

Others may readily adapt the invention for use under various conditions of service by employing one or more of the novel features involved, or equivalents thereof. It will be obvious that bolts, tubing, or any machined cylindrical part, may be finished with the tool disclosed. As at present advised with respect to the apparent scope of my invention, I desire to claim the following subject matter.

1. A tool comprising, in combination: a hub; a first male cutting member coaxial with said hub; a second female cutting member coaxial with said hub; said cutting members extending in opposite directions from said hub; a holder encircling and rotatably supporting said hub; a frame; a pivotal connection between said frame and said holder permitting rotation of such frame with respect to said holder, hub and members about a transverse axis passing through and perpendicular to the axis of said hub; yieldable catch means for holding said holder, hub and members in either of two set positions separated by 180° of rotation about said transverse axis; spring means biasing said catch means, to retain said holder in either set position with a predetermined force; said hub having ratchet teeth; a reciprocatory pawl extending along said transverse axis and movable along said transverse axis; said pawl having a head shaped to enter between said teeth; spring means resiliently urging said pawl into engagement with said teeth; said head and teeth being shaped to interlock positively against rotary force in one direction, and to lift said head over said teeth on relative rotary movement in the other direction; said teeth being shaped for operative engagement with said pawl, with said pawl facing in either direction; guide means carried by said frame and engaging the end of said pawl remote from said hub, for preventing said pawl from rotating about said transverse axis; said ratchet teeth and pawl head being shaped to interengage and lift said pawl head when said holder and hub are rotated about said transverse axis, to permit said teeth to turn 180° under the head of said pawl; thrust-receiving handle means swiveled on said frame and arranged coaxial with said hub axis when in set position; and crank-handle means projecting radially from said frame in a plane transverse to said hub axis.

2. A tool comprising, in combination: a hub; a first cutting member coaxial with said hub; a second cutting member coaxial with said hub; said cutting members extending in opposite directions from said hub; a holder encircling and rotatably supporting said hub; a frame; a pivotal connection between said frame and said holder permitting rotation of said frame with respect to said holder, hub and members about a transverse axis passing through and perpendicular to the axis of said hub; yieldable catch means for holding said holder, hub and members in either of two set positions separated by 180° of rotation about said transverse axis; spring means biasing said catch means, to retain said holder in either set position with a predetermined force; said hub having ratchet teeth; a reciprocatory pawl extending along said transverse axis and axially movable parallel to and along said transverse axis; said pawl having a head shaped to enter between said teeth; means yieldingly urging said pawl into engagement with said teeth; said head and teeth being shaped to interlock positively against rotary force in one direction, and to lift said head over said teeth on relative rotary movement in the other direction; guide means carried by said frame for preventing said pawl from rotating about said transverse axis; said ratchet teeth and pawl head being shaped to interengage and lift said pawl head when said holder and hub are rotated about said transverse axis, to permit said teeth to turn 180° under the head of said pawl; thrust-receiving handle means arranged coaxial with said hub axis when in set position; and crank-handle means for rotating said frame about said hub axis.

3. In a tool for conditioning the end of a cut or threaded pipe to remove burrs, and the like: a frame; a member journaled in said frame for rotation about a first, carrier axis; a tool extending along a second, tool axis perpendicular to said first axis; said tool being shaped to operate by rotation about said second axis; a connection between said tool and member rotatably supporting said tool on said member for rotation about the second axis but restrained from linear displacement along the second axis; torque-transmitting means for transmitting torque around the second axis in one direction only, from said member to said tool; resilient holding means tending to hold said member in either of two positions separated by 180 degrees rotation with respect to said first axis; said tool having end portions projecting in opposite directions; one end portion being shaped to bevel the outside of the end of a cut or threaded pipe; the opposite end portion being shaped to bevel the inside of the end of a cut or threaded pipe; said torque-transmitting means comprising a pawl, restrained from rotation about said first axis with respect to the frame, and slideable along said first axis, and resiliently urged toward said second axis; said tool having ratchet teeth parallel to and circumferentially spaced around said second, tool axis; said teeth each having inner radial faces and outer faces curving away from said radial faces to define a rounded tooth top; said pawl having a straight face on one side adapted to cooperate with said radial tooth faces; said pawl having an inclined, rounded heel face on the other side; said rounded heel face lifting said pawl over the adjacent teeth upon rotation of said tool about its own axis or rotation of said tool and member about said first axis; whereby said pawl transmits rotation in the same sense with respect to said frame when said tool is in either position; a thrust-receiving member on said frame located on the tool axis beyond the end of the tool; and a handle member on said frame projecting laterally in a plane normal to the tool axis and close to said first axis.

4. In a tool for conditioning the end of a cut or threaded pipe to remove burrs, and the like: a frame; a carrier journaled in said frame for rotation about a first, carrier axis; a tool extending along a second, tool axis perpendicular to said first axis; said tool being shaped to operate by rotation about its own axis; a connection between said tool and carrier rotatably supporting said tool on said carrier for rotation about the tool axis but restrained from linear displacement along the tool axis; torque-transmitting means for transmitting torque around the tool axis in one direction only, from said carrier to said tool; means for holding said member in either of two positions separated by 180 degrees rotation with respect to said carrier axis; said tool having end portions projecting in opposite directions; one end portion being shaped to bevel the outside of the end of a cut or threaded pipe; the opposite end portion being shaped to bevel the inside of the end of a cut or threaded pipe; said torque-transmitting means comprising a pawl, restrained from rotation about said carrier axis, and slideable along said carrier axis, and resiliently urged toward the axis of the tool; said tool having ratchet teeth parallel to and circumferentially spaced around the tool axis; said teeth each having inner radial faces and outer faces curving away from said radial faces to define a rounded tooth top; said pawl having a straight face on one side adapted to cooperate with said radial tooth faces; said pawl having an inclined, rounded heel face on the other side; said rounded heel face lifting said pawl over the adjacent teeth upon rotation of said tool about its own axis or about said first axis; whereby said pawl transmits rotation in the same sense with respect to said frame when said tool is in either position; a thrust-receiving member on said frame located on the tool axis beyond the end of the tool; and a handle member on said frame projecting laterally in a plane normal to the tool axis and close to said first axis.

5. In a tool for conditioning the end of a cut or threaded pipe to remove burrs, and the like: a frame; a carrier journaled in said frame for rotation about a first, carrier axis; a tool extending along a second, tool axis perpendicular to said first axis; said tool being shaped to operate by rotation about its own axis; a connection between said tool and carrier rotatably supporting said tool on said carrier for rotation about the tool axis but restrained from linear displacement along the tool axis; torque-transmitting means for transmitting torque around the tool axis in one direction only, from said carrier to said tool; means for holding said member in either of two positions separated by 180 degrees rotation with respect to said carrier axis; said tool having end portions projecting in opposite directions; one end portion being shaped to bevel the outside of the end of a cut or threaded pipe; the opposite end portion being shaped to bevel the inside of the end of a cut or threaded pipe; said torque-transmitting means comprising a pawl, restrained from rotation about said carrier axis, and slideable along said carrier axis, and resiliently urged toward the axis of the tool; said tool having ratchet teeth parallel to and circumferentially spaced around the tool axis; said teeth each having inner radial faces and outer faces curving away from said radial faces to define a rounded tooth top; said pawl having a straight face on one side adapted to cooperate with said radial tooth faces; said pawl having an inclined, rounded heel face on the other side; said rounded heel face lifting said pawl over the adjacent teeth upon rotation of said tool about its own axis or about said first axis; whereby said pawl transmits rotation in the same sense with respect to said frame when said tool is in either position.

6. In a device of the class described, in combination: a frame; a carrier journaled in said frame for rotation about a first axis; a tool journaled on said carrier for rotation about a second axis, said second axis being perpendicular to the plane of said first axis and intersecting said first axis; a pawl slideable along said first axis and restrained from rotation about said first axis; means resiliently urging said pawl toward said second axis; said pawl having a torque-transmitting face facing in one direction identified as clockwise; said pawl having an inclined pawl-lifting heel face facing in the opposite direction, identified as counterclockwise; said tool having ratchet teeth shaped to receive torque from said torque-transmitting face on either side of any tooth, and to lift said pawl by engagement of said pawl lifting face with either side of the tooth; whereby said tool and carrier can be swung about said first axis into either of two positions separated by 180 degrees of rotation, and in either position can be driven clockwise only, step by step, by rotary reciprocation of said frame and carrier about the tool axis.

7. In a device of the class described, in combination: a frame; a carrier journaled in said frame for rotation about a first axis; a tool journaled on said carrier for rotation about a second axis, said second axis being perpendicular to the plane of said first axis; a pawl slideable along said first axis and restrained from rotation about said first axis; means resiliently urging said pawl toward said second axis; said pawl having a torque-transmitting face facing in one direction identified as clockwise; said pawl having an inclined pawl-lifting heel face facing in the opposite direction, identified as counterclockwise; said tool having ratchet teeth shaped to receive torque from said torque-transmitting face on either side of any tooth and to lift said pawl by engagement, said pawl lifting face with either side of the tooth; whereby said tool and member can be swung into either of two positions, and in either position can be driven clockwise, step by step, by rotary reciprocation of said frame about the tool axis.

References Cited in the file of this patent

UNITED STATES PATENTS

| Number | Name | Date |
|---|---|---|
| 1,061,706 | Tunstall | May 13, 1913 |
| 1,697,414 | Cordray | Jan. 1, 1929 |
| 1,789,080 | Neldner | Jan. 13, 1931 |
| 2,431,654 | White | Nov. 25, 1947 |
| 2,453,848 | Livingston et al. | Nov. 16, 1948 |
| 2,493,039 | Sochia | Jan. 3, 1950 |
| 2,499,658 | Livingston et al. | Mar. 7, 1950 |
| 2,552,998 | Norton | May 15, 1951 |

FOREIGN PATENTS

| Number | Country | Date |
|---|---|---|
| 558,026 | Great Britain | Dec. 15, 1943 |